US012241225B2

(12) United States Patent
Uchimaru et al.

(10) Patent No.: US 12,241,225 B2
(45) Date of Patent: Mar. 4, 2025

(54) WORK MACHINE COOLING UNIT FAN HOUSING

(71) Applicant: KOMATSU LTD., Tokyo (JP)

(72) Inventors: Masatoshi Uchimaru, Tokyo (JP); Yuusuke Kondou, Tokyo (JP); Kozo Okuda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 305 days.

(21) Appl. No.: 17/787,625

(22) PCT Filed: Dec. 10, 2020

(86) PCT No.: PCT/JP2020/045986
§ 371 (c)(1),
(2) Date: Jun. 21, 2022

(87) PCT Pub. No.: WO2021/131734
PCT Pub. Date: Jul. 1, 2021

(65) Prior Publication Data
US 2023/0028422 A1    Jan. 26, 2023

(30) Foreign Application Priority Data

Dec. 23, 2019 (JP) ................................. 2019-231541

(51) Int. Cl.
*E02F 9/08* (2006.01)
*B60K 11/04* (2006.01)

(52) U.S. Cl.
CPC ............ *E02F 9/0866* (2013.01); *B60K 11/04* (2013.01)

(58) Field of Classification Search
CPC ..... E02F 9/0866; E02F 9/0858; E02F 9/0883; E02F 9/08; B60K 11/04; B60K 11/00; B60K 11/02; B60K 11/06
See application file for complete search history.

(56) References Cited

U.S. PATENT DOCUMENTS 5,692,467 A * 12/1997 Sahm ....................... F01P 11/12
181/204
5,816,351 A * 10/1998 Akira ..................... E02F 9/0891
180/68.1

(Continued)

FOREIGN PATENT DOCUMENTS

JP    H11-093206 A    4/1999
JP    2001-064996 A    3/2001

(Continued)

*Primary Examiner* — James M Dolak
(74) *Attorney, Agent, or Firm* — Faegre Drinker Biddle & Reath LLP

(57) ABSTRACT

An oil cooler is disposed on the vehicle body and includes a fan that creates an air flow and a housing that houses the fan. The housing has a first side surface which is disposed on the upstream side of the air flow, a second side surface which is disposed on the downstream side of the air flow, and a third side surface which is connected to the first side surface and the second side surface. The vehicle body is provided with a first passage which is disposed on the side of the first side surface, a second passage which is disposed on the side of the second side surface and on an outer edge of the vehicle body in a top view, and a third passage which is disposed on the side of the third side surface and is connected to the first passage and the second passage.

7 Claims, 7 Drawing Sheets

(56) References Cited

U.S. PATENT DOCUMENTS

| | | | | |
|---|---|---|---|---|
| 6,435,264 | B1* | 8/2002 | Konno | F01P 3/18 |
| | | | | 165/41 |
| 6,922,925 | B2* | 8/2005 | Watanabe | E02F 9/00 |
| | | | | 123/41.62 |
| 7,134,518 | B2* | 11/2006 | Arai | B60K 11/04 |
| | | | | 180/68.1 |
| 7,388,301 | B2* | 6/2008 | Komiyama | E02F 9/2075 |
| | | | | 290/40 C |
| 8,365,855 | B2* | 2/2013 | Mamada | E02F 9/0866 |
| | | | | 180/312 |
| 8,550,198 | B2* | 10/2013 | Isaka | E02F 9/00 |
| | | | | 180/68.1 |
| 8,640,803 | B2* | 2/2014 | Kinoshita | F01P 11/10 |
| | | | | 180/68.1 |
| 8,919,140 | B2* | 12/2014 | Johnson | B60H 1/00378 |
| | | | | 62/133 |
| 8,960,342 | B2* | 2/2015 | Werner | B60K 11/04 |
| | | | | 165/41 |
| 9,091,038 | B2* | 7/2015 | Tsuchihashi | F01P 11/12 |
| 9,327,582 | B2* | 5/2016 | Matsumiya | B60H 1/00378 |
| 9,340,952 | B2* | 5/2016 | Sasaki | E02F 3/325 |
| 9,388,689 | B2* | 7/2016 | Bienfang | E21C 27/30 |
| 9,518,373 | B1* | 12/2016 | Ueda | E02F 9/0891 |
| 9,644,343 | B2* | 5/2017 | Herzberg | E02F 9/0866 |
| 9,657,458 | B2* | 5/2017 | Hutchinson | E02F 9/0833 |
| 9,702,113 | B2* | 7/2017 | Kotaki | B60R 1/26 |
| 9,752,302 | B2* | 9/2017 | Yamashita | E02F 9/0866 |
| 10,066,358 | B2* | 9/2018 | Ota | F02B 63/04 |
| 10,174,482 | B2* | 1/2019 | Todokoro | E02F 9/0808 |
| 10,471,802 | B2* | 11/2019 | Murata | B66C 13/54 |
| 10,640,949 | B2* | 5/2020 | Hirasawa | E02F 9/0883 |
| 11,299,033 | B2* | 4/2022 | Ikeda | F01P 3/18 |
| 11,448,115 | B2* | 9/2022 | Seo | E02F 9/0833 |
| 12,090,812 | B2* | 9/2024 | Ishikawa | B60H 1/00378 |
| 2014/0219762 | A1 | 8/2014 | Bienfang et al. | |
| 2014/0301839 | A1* | 10/2014 | Funabashi | F04D 19/002 |
| | | | | 415/208.2 |
| 2015/0225926 | A1 | 8/2015 | Hutchinson et al. | |
| 2018/0178616 | A1 | 6/2018 | Murata et al. | |

FOREIGN PATENT DOCUMENTS

| | | |
|---|---|---|
| JP | 2009-155906 A | 7/2009 |
| JP | 2010-168739 A | 8/2010 |
| JP | 2010-265687 A | 11/2010 |
| WO | WO-2018/029821 A1 | 2/2018 |

* cited by examiner

WORK MACHINE COOLING UNIT FAN HOUSING

TECHNICAL FIELD

The present disclosure relates to a work machine.

BACKGROUND ART

For example, Japanese Patent Laying-Open No. 11-93206 (PTL 1) discloses a hydraulic excavator including an upper revolving unit and an oil cooler housed in a chamber of the upper revolving unit. The upper revolving unit is provided with a fender to form a passage.

CITATION LIST

Patent Literature

PTL 1: Japanese Patent Laying-Open No. 11-93206

SUMMARY OF INVENTION

Technical Problem

In the hydraulic excavator disclosed in PTL 1 described above, along with the operation of the oil cooler, dust in the air may adhere to a fan, a core or the like housed inside the oil cooler, and therefore, it is necessary to clean the oil cooler periodically. However, depending on the layout of the passage disposed around the oil cooler, it may be difficult to clean the oil cooler.

In addition, the oil cooler discharges air that has become hot due to the heat exchange with oil. Depending on the position where the hot air is discharged from the oil cooler, the hot air may adversely affect the performance of the hydraulic excavator.

Therefore, an object of the present disclosure is to provide a work machine which allows a cooling unit thereof to be cleaned easily and prevents the performance thereof from being degraded by the hot air discharged from the cooling unit.

Solution to Problem

A work machine according to the present disclosure includes a work-machine body and a cooling unit. The cooling unit includes a fan and a housing. The fan creates an air flow. The housing houses the fan. The cooling unit is disposed on the work-machine body. The housing has a first side surface, a second side surface, and a third side surface. The first side surface is disposed on the upstream side of the air flow. The second side surface is disposed on the downstream side of the air flow. The third side surface is connected to the first side surface and the second side surface. The work-machine body is provided with a first passage, a second passage, and a third passage. The first passage is disposed on the side of the first side surface. The second passage is disposed on the side of the second side surface. The second passage is disposed on an outer edge of the work-machine body in a top view. The third passage is disposed on the side of the third side surface. The third passage is connected to the first passage and the second passage.

Advantageous Effects of Invention

According to the present disclosure, it is possible to provide a work machine which allows a cooling unit thereof to be cleaned easily and prevents the performance thereof from being degraded by the hot air discharged from the cooling unit.

DESCRIPTION OF EMBODIMENTS

Figure 1:
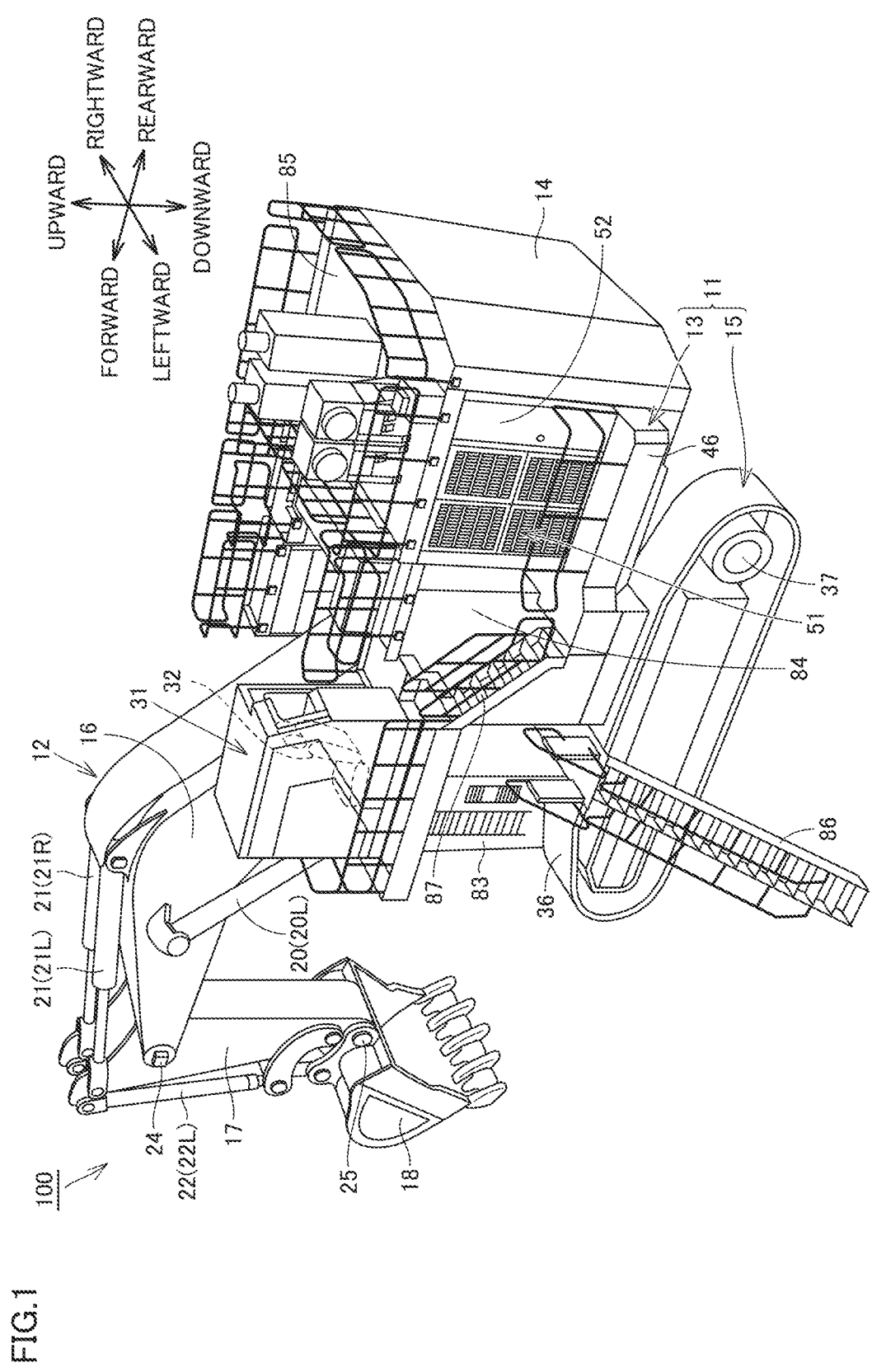
FIG. 1 is a perspective view illustrating a hydraulic excavator according to an embodiment of the present disclosure.

Embodiments of the present disclosure will be described with reference to the drawings. In the drawings, the same or corresponding members are denoted by the same reference numerals.

Figure 2:
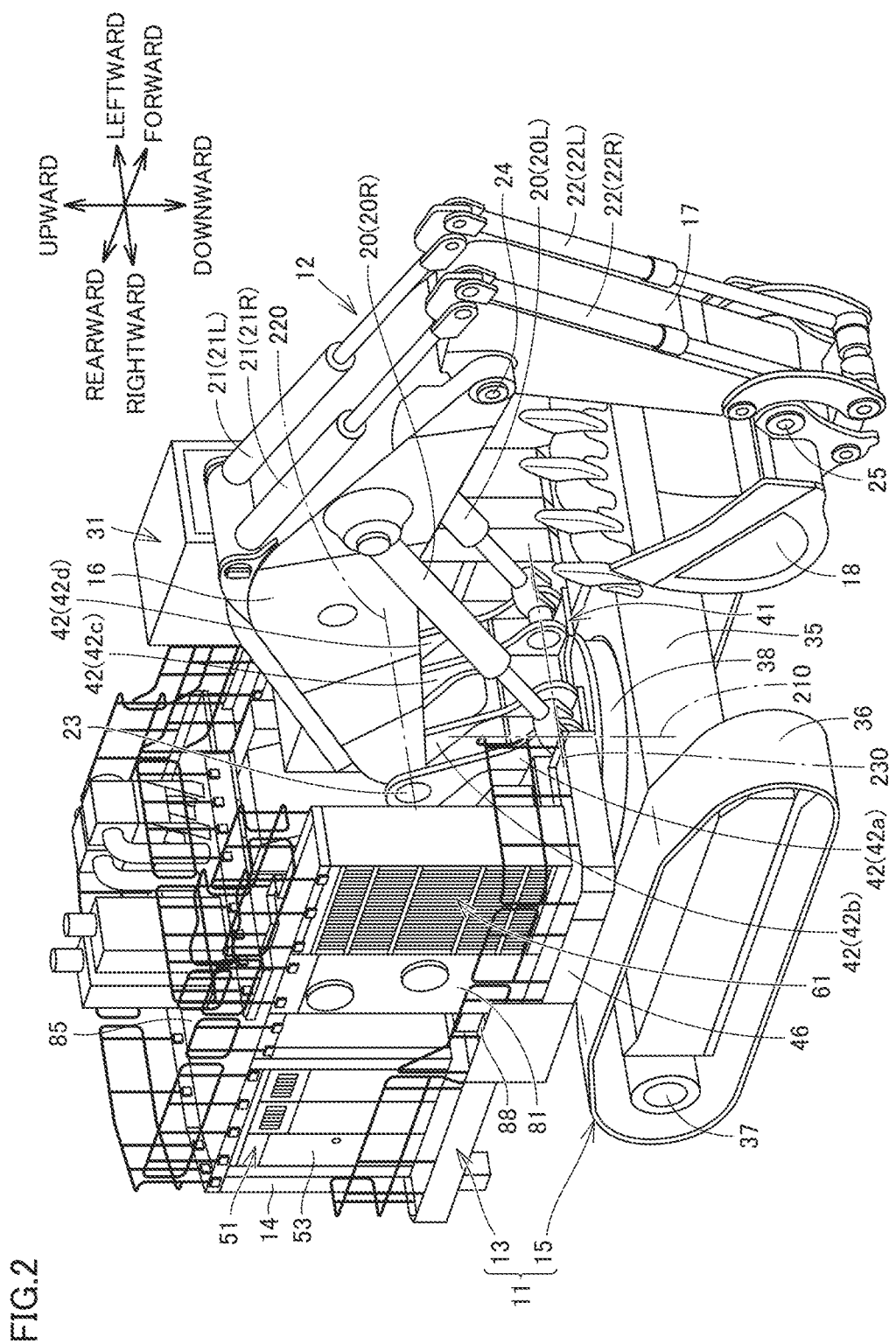
FIG. 2 is another perspective view illustrating the hydraulic excavator according to an embodiment of the present disclosure.

FIGS. 1 and 2 are perspective views illustrating a hydraulic excavator according to an embodiment of the present disclosure. As illustrated in FIGS. 1 and 2, the hydraulic excavator 100 includes a vehicle body 11 and a work implement 12. The vehicle body 11 includes a revolving unit 13, a travel unit 15, and a revolving mechanism 38.

The revolving unit 13 is disposed on the travel unit 15. The revolving mechanism 38 is disposed between the travel unit 15 and the revolving unit 13. The revolving mechanism 38 revolves the revolving unit 13 with respect to the travel unit 15. A revolution shaft 210 of the revolving unit 13 extends in an upward and downward direction. The revolving unit 13 includes a cab 31. The cab 31 is provided with an operator's seat 32 on which an operator sits. The operator rides in the cab 31 and sits on the operator's seat 32 to operate the hydraulic excavator 100.

In the present specification, the forward and rearward direction refers to a forward direction and a rearward direction of the operator seated on the operator's seat 31. The direction facing the operator seated on the operator's seat 31 is defined as the forward direction, and the direction rearward the operator seated on the operator's seat 31 is defined as the rearward direction. The leftward and rightward direction (lateral direction) refers to a leftward direction and a rightward direction of the operator seated on the operator's seat 31. When the operator seated on the operator's seat 31 faces the forward direction, the right side of the operator is defined as the rightward direction, and the left side of the operator is defined as the leftward direction. The upward and downward direction refers to a direction orthogonal to a plane defined by the forward and rearward direction and the leftward and rightward direction. The side downward the ground is defined as a downward direction, and the side upward the sky is defined as an upward direction.

The travel unit 15 includes a travel frame 35, a pair of right and left crawler belts 36, and a travel motor 37.

The travel frame 35 constitutes a base frame of the travel unit 15, and supports the crawler belts 36 and the travel motor 37. The travel frame 35 is disposed between the pair of right and left crawler belts 36. The revolving mechanism 38 is mounted on the travel frame 35. The hydraulic excavator 100 travels by the rolling of the crawler belts 36. The travel motor 37 is provided in the travel unit 15 as a driving source. The travel motor 37 is a hydraulic motor driven by hydraulic oil. Alternatively, the travel unit 15 may include wheels (tires).

The work implement 12 is attached to a front end of the revolving unit 13. The work implement 12 is supported by the vehicle body 11 (the revolving unit 13). The work implement 12 performs works such as land excavation and the like. The work implement 12 includes a boom 16, an arm 17, and a bucket 18.

The boom 16 is rotatably connected to the vehicle body 11 (the revolving unit 13) via a boom pin 23. The arm 17 is rotatably connected to the boom 16 via an arm pin 24. The bucket 18 is rotatably connected to the arm 17 via a bucket pin 25.

The work implement 12 further includes a pair of boom cylinders 20 (20L, 20R), a pair of arm cylinders 21 (21L, 21R), and a pair of bucket cylinders 22 (22L, 22R). The pair of boom cylinder 20, the pair of arm cylinder 21 and the pair of bucket cylinder 22 are hydraulic cylinders driven by the hydraulic oil.

The boom cylinder 20L and the boom cylinder 20R are provided in pairs in the leftward and rightward direction. The boom cylinder 20L and the boom cylinder 20R are driven to extend or contract in synchronization with each other so as to rotate the boom 16. The arm cylinder 21L and the arm cylinder 21R are provided in pairs in the leftward and rightward direction. The arm cylinder 21L and the arm cylinder 21R are driven to extend or contract in synchronization with each other so as to rotate the arm 17. The bucket cylinder 22L and the bucket cylinder 22R are provided in pairs in the leftward and rightward direction. The bucket cylinder 22L and the bucket cylinder 22R are driven to extend or contract in synchronization with each other so as to rotate the bucket 18.

Figure 3:
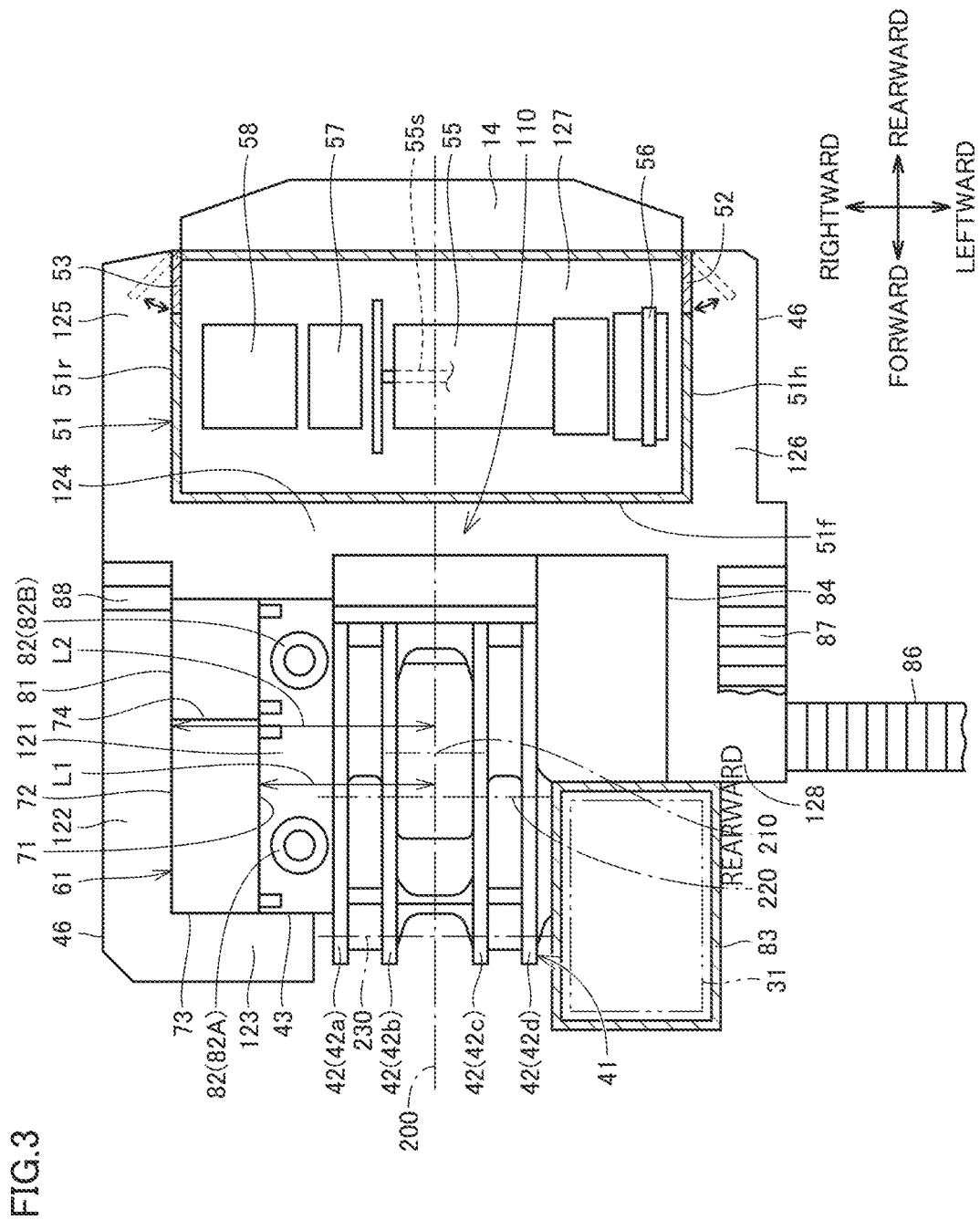
FIG. 3 is a cross-sectional view illustrating components disposed on a revolving unit in FIG. 1.

FIG. 3 is a cross-sectional view illustrating components disposed on the revolving unit in FIG. 1. As illustrated in FIGS. 1 to 3, the revolving unit 13 includes a revolving frame 41, a platform 46, and a counterweight 14.

The revolving frame 41 constitutes a base frame of the revolving unit 13, and is connected to the revolving mechanism 38. The platform 46 is supported by the revolving frame 41. The platform 46 is disposed at both ends of the revolving frame 41 in the leftward and rightward direction. The counterweight 14 is disposed at a rear end of the revolving unit 13.

As illustrated in FIGS. 2 and 3, the revolving frame 41 is disposed with a plurality of vertical plates 42 (42a, 42b, 42c, 42d). Each vertical plate 42 has a plate shape extending in a direction orthogonal to the leftward and rightward direction. The plurality of vertical plates 42 are disposed with an interval between each other in the leftward and rightward direction. The vertical plate 42a, the vertical plate 42b, the vertical plate 42c, and the vertical plate 42d are disposed in this order from the right side to the left side.

The boom 16 is inserted between the vertical plate 42a and the vertical plate 42b and between the vertical plate 42c and the vertical plate 42d, and is rotatably connected to the revolving frame 41. A pivot shaft 220 of the boom 16 along which the boom 16 pivots with respect to the rotation frame 41 extends in the leftward and rightward direction, and the boom pin 23 is arranged on the pivot shaft 220. The boom cylinder 20R (an end of the piston rod) is rotatably connected to the revolving frame 41 via a pin member extending between the vertical plate 42a and the vertical plate 42b. The boom cylinder 20L (an end of the piston rod) is rotatably connected to the revolving frame 41 via a pin member extending between the vertical plate 42c and the vertical plate 42d. A pivot shaft 230 of the boom cylinder 20 along which the boom cylinder 20 pivots with respect to the rotation frame 41 extends in the leftward and rightward direction.

The pivot shaft 230 of the boom cylinder 20 is disposed at a position in front of the pivot shaft 220 of the boom 16. The pivot shaft 230 of the boom cylinder 20 is disposed at a position lower than the pivot shaft 220 of the boom 16. The revolution shaft 210 of the revolving unit 13 is disposed at a position behind the pivot shaft 230 of the boom cylinder 20 and the pivot shaft 220 of the boom 16.

The vertical plate 42 has an inverted V shape which has a vertex where the pivot shaft 220 of the boom 16 is arranged, and two sides extending obliquely downward in the frontward and rearward direction from the vertex where the pivot shaft 220 of the boom 16 is arranged.

As illustrated in FIG. 3, the vehicle body 11 (the revolving unit 13) has an upper surface 110. The upper surface 110 faces upward. The upper surface 110 is constituted by the revolving frame 41 and the platform 46. The upper surface 110 as a whole has a rectangular shape having a pair of sides extending in the leftward and rightward direction and a pair of sides extending in the frontward and rearward direction.

As illustrated in FIGS. 1 to 3, when the ground is referred to as a first floor, the upper surface 110 constitutes a second floor of the hydraulic excavator 100. A first ladder 86 is placed between the first floor, i.e., the ground and the second floor, i.e., the upper surface 110. The first ladder 86 is a foldable ladder and may be folded at a position away from the ground. The first ladder 86 is disposed at the left end of the upper surface 110. The operator can use the first ladder 86 to move up and down between the first floor, i.e., the ground and the second floor, i.e., the upper surface 110.

FIG. 3 illustrates a center line 200 which passes through the revolution shaft 210 of the revolving unit 13 and extends in the frontward and rearward direction.

The hydraulic excavator 100 further includes a radiator 56, an engine 55, a power take-off device (PTO) 57, an oil pump 58, an oil cooler 61, a hydraulic oil tank 81, a hydraulic revolving motor 82 (82A, 82B), and a fuel tank 84.

The radiator 56, the engine 55, the PTO 57, the oil pump 58, the oil cooler 61, the hydraulic oil tank 81, the hydraulic revolving motor 82, and the fuel tank 84 are disposed on the vehicle body 11 (the upper surface 110).

The radiator 56, the engine 55, the PTO 57, and the oil pump 58 are disposed at a position closer to the rear end of the vehicle body 11 (upper surface 110). The radiator 56, the engine 55, the PTO 57, and the oil pump 58 are disposed at a position behind the plurality of vertical plates 42. The radiator 56, the engine 55, the PTO 57, and the oil pump 58 are disposed at a position in front of the counterweight 14.

The radiator 56, the engine 55, the PTO 57, and the oil pump 58 are disposed side by side in the leftward and rightward direction. The radiator 56, the engine 55, the PTO 57, and the oil pump 58 are disposed in this order from the left side to the right side. The radiator 56, the engine 55, the PTO 57, and the oil pump 58 may be disposed side by side in a reversed direction.

The engine 55 has a crankshaft 55s. The crankshaft 55s is configured to convert a reciprocating motion of a piston in the engine 55 into a rotational motion. The engine 55 is arranged in such a manner that the crankshaft 55s extends in the leftward and rightward direction.

The oil pump 58 is connected to the engine 55 through the intermediary of the PTO 57. The PTO 57 transmits the rotational motion output from the engine 55 to the oil pump 58. The oil pump 58 is driven by the rotational motion received from the PTO 57. The oil pump 58 supplies hydraulic oil stored in a hydraulic oil tank 81, which will be described later, to various hydraulic components such as the boom cylinder 20, the arm cylinder 21, the bucket cylinder 22, and the hydraulic revolving motor 82.

The radiator 56 cools the cooling water of the engine 55. The radiator 56 has a fan (not shown). The fan is rotated by the rotational motion output from the engine 55 to create an air flow for cooling the cooling water.

The oil cooler 61 and the hydraulic oil tank 81 are disposed at a position closer to the front end of the vehicle body 11 (the upper surface 110). The oil cooler 61 and the hydraulic oil tank 81 are disposed at a position in front of the oil pump 58. The oil cooler 61 and the hydraulic oil tank 81 are disposed at a position right to the plurality of vertical plates 42 (the vertical plate 42a). The oil cooler 61 and the hydraulic oil tank 81 are disposed at a position right to and separated from the plurality of vertical plates 42 (the vertical plate 42a).

In FIG. 3 which illustrates a top view of the rotating body 13, the oil cooler 61 is disposed at a position intersecting with a straight line extending from the pivot shaft 220 of the boom 16 in the leftward and rightward direction. The oil cooler 61 is disposed at a position intersecting with a straight line passing through the revolution shaft 210 of the revolving unit 13 and extending in the leftward and rightward direction. The oil cooler 61 is disposed at a position behind a straight line extending from the pivot shaft 230 of the boom cylinder 20 in the leftward and rightward direction.

The hydraulic oil tank 81 is disposed side by side with the oil cooler 61 in the frontward and rearward direction. The hydraulic oil tank 81 is disposed at a position behind the oil cooler 61.

The oil cooler 61 cools the hydraulic oil supplied from the oil pump 58 to various hydraulic components. The hydraulic oil tank 81 stores the hydraulic oil cooled by the oil cooler 61.

The hydraulic revolving motor 82 is disposed between the plurality of vertical plates 42 (the vertical plate 42a), and the oil cooler 61 and the hydraulic oil tank 81 in the leftward and rightward direction. The hydraulic revolving motor 82A and the hydraulic revolving motor 82B are disposed side by side in the frontward and rearward direction. The hydraulic revolving motor 82A is disposed between the plurality of vertical plates 42 (the vertical plate 42a) and the oil cooler 61 in the leftward and rightward direction. The hydraulic revolving motor 82B is disposed between the plurality of vertical plates 42 (the vertical plate 42a) and the hydraulic oil tank 81 in the leftward and rightward direction. The hydraulic revolving motor 82A is disposed at a position in front of the revolution shaft 210 of the revolving unit 13. The hydraulic revolving motor 82B is disposed at a position behind the revolution shaft 210 of the revolving unit 13.

The hydraulic revolving motor 82 is driven to rotate by the hydraulic oil supplied from the oil pump 58. The hydraulic revolving motor 82 is provided as a driving source of the revolving mechanism 38.

The fuel tank 84 is disposed at a position closer to the front end of the upper surface 110. The fuel tank 84 is disposed at a position in front of the engine 55 and the radiator 56. The fuel tank 84 is disposed at a position left to the plurality of vertical plates 42 (the vertical plate 42d). The fuel tank 84 stores fuel to be supplied to the engine 55.

The hydraulic excavator 100 further includes an engine compartment 51 and an electric chamber 83. The engine compartment 51 and the electric chamber 83 are disposed on the vehicle body 11 (the upper surface 110).

The engine compartment 51 forms an inner space for housing the engine 55. The engine compartment 51 further houses the radiator 56, the PTO 57, and the oil pump 58. In FIG. 3 which illustrates a top view of the revolving unit 13, the engine compartment 51 has a rectangular shape which has a pair of sides extending in the frontward and rearward direction and a pair of sides extending in the leftward and rightward direction. The engine compartment 51 has a rectangular shape, the longitudinal direction of which is identical to the leftward and rightward direction, and the short-length direction of which is identical to the frontward and rearward direction.

As illustrated in FIG. 3, the engine compartment 51 includes a front side surface 51f, a right side surface 51r, and a left side surface 51h. The front side surface 51f is disposed to face the forward direction. The right side surface 51r is disposed to face the rightward direction. The left side surface 51h is disposed to face the leftward direction. The right end of the front side surface 51f is connected to the front end of the right side surface 51r. The left end of the front side surface 51f is connected to the front end of the left side surface 51h.

As illustrated in FIGS. 1 to 3, the engine compartment 51 is disposed with a first door 52 and a second door 53 that can be opened and closed. The first door 52 is disposed on the left side surface 51h. The first door 52 is disposed at a position closer to the rear end of the left side surface 51h. The second door 53 is disposed on the right side surface 51r. The second door 53 is disposed at a position closer to the rear end of the right side surface 51r. The operator can move between the inner space that houses the engine 55 and the like and the outside through an entrance formed when the first door 52 or the second door 53 is opened.

The electric chamber 83 forms an inner space for housing various electric devices such as a power storage device or a power control device. The electric chamber 83 is disposed at a position closer to the front end of the vehicle body 11 (the upper surface 110). The electric chamber 83 is provided at a positon in front of the fuel tank 84. The electric chamber 83 is disposed at a position left to the plurality of vertical plates 42 (the vertical plate 42d). The electric chamber 83 has a rectangular shape which has a pair of sides extending in the frontward and rearward direction and a pair of sides extending in the leftward and rightward direction in FIG. 3 which illustrates a top view of the revolving unit 13.

The vehicle body 11 (the revolving unit 13) further includes a roof surface 85. The roof surface 85 constitutes a third floor of the hydraulic excavator 100. The roof surface 85 is formed by the roof of the engine compartment 51, the roof of the electric chamber 83, the roof of the oil cooler 61, and the roof of the hydraulic oil tank 81.

The cab 31 is disposed on the roof surface 85. The cab 31 is disposed above the electric chamber 83. A second ladder 87 is disposed between the upper surface 110, i.e., the second floor and the roof surface 85, i.e., the third floor. The second ladder 87 is disposed left of the fuel tank 84. The operator can use the second ladder 87 to move up and down between the second floor, i.e., the upper surface 110 and the third floor, i.e., the roof surface 85.

As illustrated in FIG. 3, the vehicle body 11 (the upper surface 110) is provided with a first passage 121, a second passage 122, a third passage 123, a fourth passage 124, a fifth passage 125, a sixth passage 126, a seventh passage 127, and an eighth passage 128. Each of the first passage 121, the second passage 122, the third passage 123, the fourth passage 124, the fifth passage 125, the sixth passage 126, the seventh passage 127, and the eighth passage 128 forms a space for the operator to enter. Each of the first passage 121, the second passage 122, the third passage 123, the fourth passage 124, the fifth passage 125, the sixth passage 126, the seventh passage 127, and the eighth passage 128 forms a space for the operator to walk.

The first passage 121 is disposed on the left side of the oil cooler 61 and the hydraulic oil tank 81. The first passage 121 extends in the frontward and rearward direction. The second passage 122 is disposed on the right side of the oil cooler 61 and the hydraulic oil tank 81. The second passage 122 extends in the frontward and rearward direction. The third passage 123 is provided at a positon in front of the oil cooler 61. The third passage 123 extends in the leftward and rightward direction. The hydraulic oil tank 81 is disposed on the side opposite to the third passage 123 with respect to the oil cooler 61.

The first passage 121, the second passage 122, and the third passage 123 will be described in detail later.

The fourth passage 124 is disposed on the side of the front side surface 51f of the engine compartment 51. The fourth passage 124 extends along the front side surface 51f of the engine compartment 51. The fourth passage 124 extends in the leftward and rightward direction. The fourth passage 124 extends in the leftward and rightward direction and passes between the hydraulic oil tank 81, the plurality of vertical plates 42 and the fuel tank 84, and the engine compartment 51. The fourth passage 124 is disposed on the side opposite to the third passage 123 with respect to the oil cooler 61.

The fifth passage 125 is disposed on the side of the right side surface 51r of the engine compartment 51. The fifth passage 125 extends along the right side surface 51r of the engine compartment 51. The fifth passage 125 extends in the frontward and rearward direction. The sixth passage 126 is disposed on the side of the left side surface 51h of the engine compartment 51. The sixth passage 126 extends along the left side surface 51h of the engine compartment 51. The sixth passage 126 extends in the frontward and rearward direction. The fourth passage 124 is connected to the fifth passage 125 and the sixth passage 126. The right end of the fourth passage 124 is connected to the front end of the fifth passage 125. The left end of the fourth passage 124 is connected to the front end of the sixth passage 126.

The seventh passage 127 is disposed inside the engine compartment 51. The seventh passage 127 is disposed at a position behind the engine 55, the radiator 56, the PTO 57, and the oil pump 58. The seventh passage 127 extends in the leftward and rightward direction. The seventh passage 127 is connected to the fifth passage 125 and the sixth passage 126. The right end of the seventh passage 127 is connected to the rear end of the fifth passage 125 through an entrance formed when the second door 53 is opened. The left end of the seventh passage 127 is connected to the rear end of the sixth passage 126 through an entrance formed when the first door 52 is opened.

The fourth passage 124, the fifth passage 125, the seventh passage 127, and the sixth passage 126 form a circumferential passage that surrounds the engine 55, the radiator 56, the PTO 57, and the oil pump 58 in the engine compartment 51.

The eighth passage 128 extends between an entrance to the first ladder 86 and an entrance to the second ladder 87 on the upper surface 110. The eighth passage 128 is disposed on the left side of the fuel tank 84. The eighth passage 128 is connected to the fourth passage 124 and the sixth passage 126.

The other passages except the seventh passage 127 are disposed as outdoor passages. The height of each of the second passage 122 and the third passage 123 is lower than the height of each of the other passages. A footboard 88 is disposed between the second passage 122, and the fourth passage 124 and the fifth passage 125.

Figure 4:
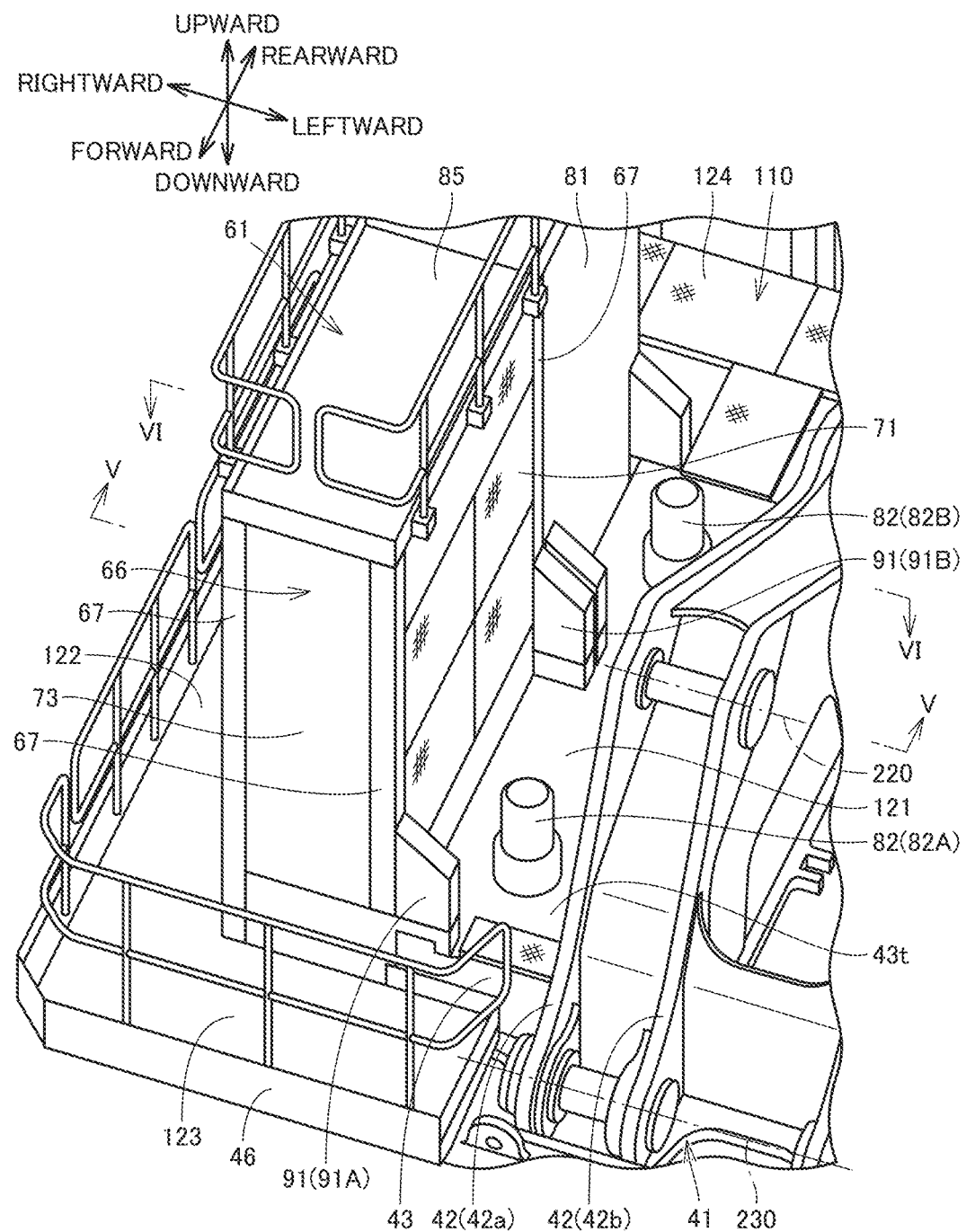
FIG. 4 is a perspective view illustrating a part of the hydraulic excavator around an oil cooler in FIG. 2.
Figure 5:
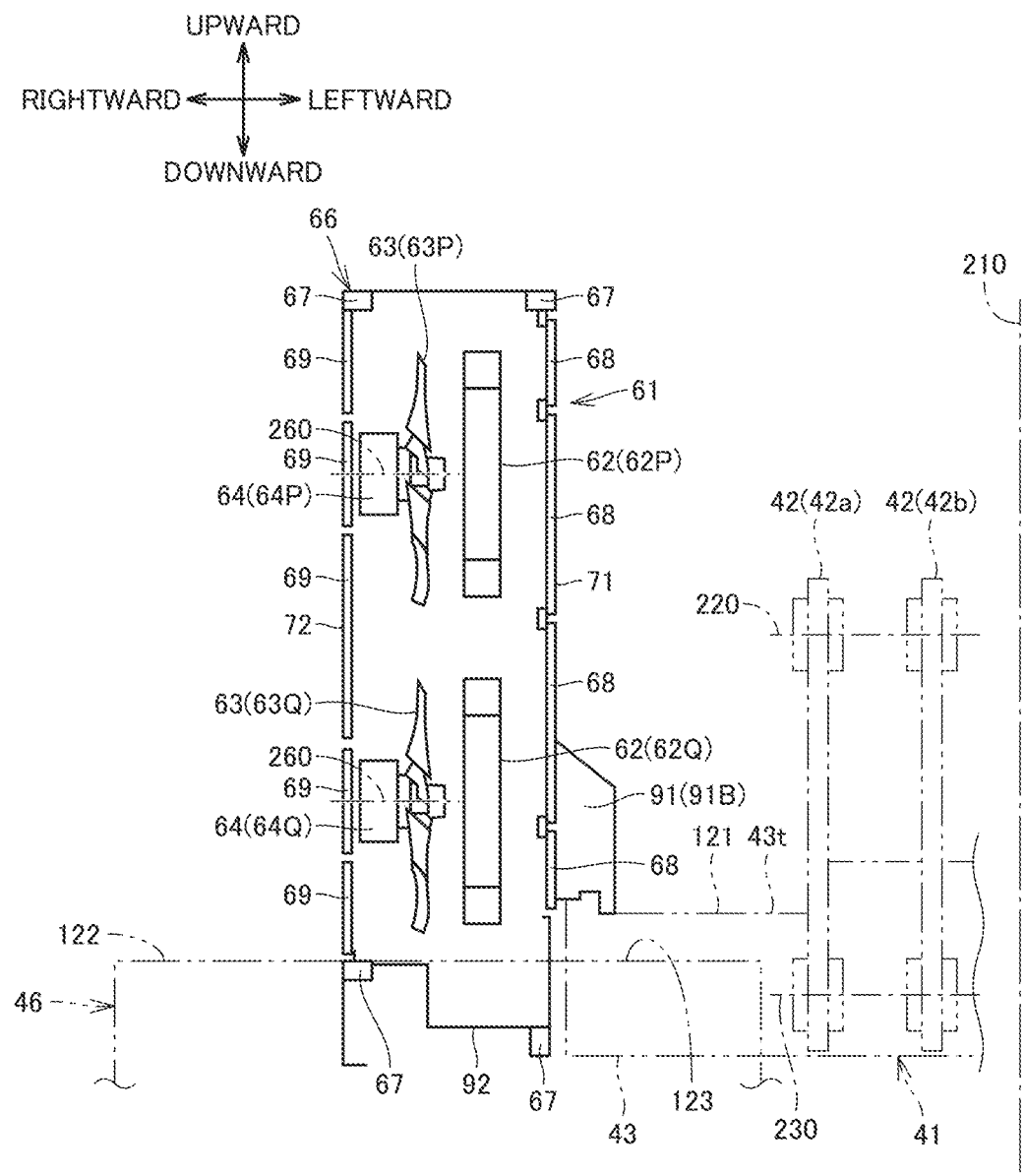
FIG. 5 is a cross-sectional view of the hydraulic excavator taken along line V-V in FIG. 4.
Figure 6:
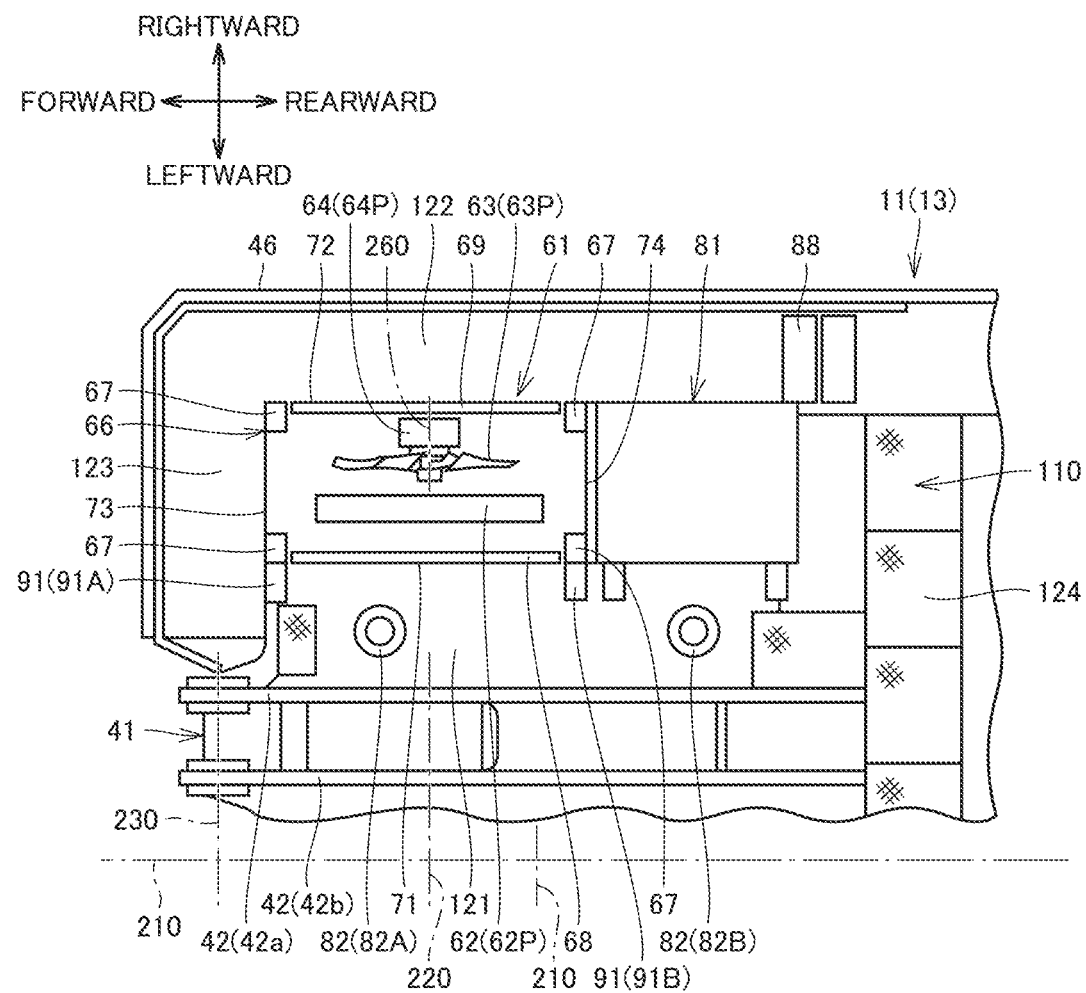
FIG. 6 is a cross-sectional view of the hydraulic excavator taken along line VI-VI in FIG. 4.

Next, the structure of the oil cooler 61 will be described. FIG. 4 is a perspective view illustrating a part of the hydraulic excavator around the oil cooler in FIG. 2. FIG. 5 is a cross-sectional view of the hydraulic excavator taken along line V-V in FIG. 4. FIG. 6 is a cross-sectional view of the hydraulic excavator taken along line VI-VI in FIG. 4.

As illustrated in FIGS. 4 to 6, the oil cooler 61 includes a housing 66, a core 62 (62P, 62Q), a fan 63 (63P, 63Q), and a motor 64 (64P, 64Q).

The housing 66 forms an outer appearance of the oil cooler 61. The housing 66 has a cuboid shape. In FIG. 6 which illustrates a top view of the oil cooler 61, the housing 66 has a rectangular shape. The housing 66 has a rectangular shape which has a pair of sides extending in the frontward and rearward direction and a pair of sides extending in the leftward and rightward direction. The housing 66 has a rectangular shape, the longitudinal direction of which is identical to the frontward and rearward direction, and short-length direction of which is identical to the leftward and rightward direction.

The housing 66 includes a first side surface 71, a second side surface 72, a third side surface 73, and a fourth side surface 74. The first side surface 71, the second side surface 72, the third side surface 73, and the fourth side surface 74 are disposed to face the horizontal direction.

The first side surface 71 is disposed to face the leftward direction. The first side surface 71 is orthogonal to the leftward and rightward direction. The first side surface 71 faces the vertical plate 42a in the leftward and rightward direction. The second side surface 72 is disposed to face the rightward direction. The second side surface 72 is orthogonal to the leftward and rightward direction. The second side surface 72 is disposed in parallel with the first side surface 71.

The third side surface 73 is disposed to face the forward direction. The third side surface 73 is orthogonal to the frontward and rearward direction. The third side surface 73 is connected to the first side surface 71 and the second side surface 72. The left end of the third side surface 73 is connected to the front end of the first side surface 71. The right end of the third side surface 73 is connected to the front end of the second side surface 72.

The fourth side surface 74 is disposed to face the rearward direction. The fourth side surface 74 is orthogonal to the frontward and rearward direction. The fourth side surface 74 is disposed in parallel with the third side surface 73. The fourth side surface 74 faces the hydraulic oil tank 81 in the frontward and rearward direction. The fourth side surface 74 is connected to the first side surface 71 and the second side surface 72. The left end of the fourth side surface 74 is connected to the rear end of the first side surface 71. The right end of the fourth side surface 74 is connected to the rear end of the second side surface 72.

The housing 66 includes a frame 67, a plurality of first lids 68, and a plurality of second lids 69.

The frame 67 extends along the sides of the cuboid shape of the housing 66. Each of the first lid 68 and the second lid 69 is a plate material provided with vent holes. The plurality of first lids 68 are disposed on the first side surface 71. The plurality of first lids 68 are detachably attached to the frame 67. The plurality of first lids 68 are disposed side by side in the upward and downward direction. The plurality of second lids 69 are disposed on the second side surface 72. The plurality of second lids 69 are detachably attached to the frame 67. The plurality of second lids 69 are disposed side by side in the upward and downward direction.

The core 62, the fan 63, and the motor 64 are housed inside the housing 66.

The core 62 forms a flow passage through which oil (hydraulic oil) flows. The core 62 exchanges heat between the hydraulic oil and the air.

As an example, the core 62 is constituted by a plurality of fins which are disposed with an interval between each other, and a tube which forms a flow path through which the hydraulic oil flows and extends through the plurality of fins. The hydraulic oil radiates heat to the air through the intermediary of the plurality of fins as it flows through the flow path formed by the tube. The core 62 may be a down-flow core in which the oil flows in the downward direction, or a side-flow core in which the oil flows in the horizontal direction.

The fan 63 creates an air flow. The fan 63 is configured to supply air to the core 62 as the cooling air. The fan 63 is a propeller fan. The rotation shaft 260 of the fan 63 is extends in the leftward and rightward direction. The motor 64 is connected to the fan 63. The motor 64 drives the fan 63 to rotate. The motor 64 is a hydraulic motor driven by the hydraulic oil. Alternatively, an electric motor may be used to replace the hydraulic motor.

The fan 63 creates an air flow flowing from the first side surface 71 toward the second side surface 72. In accordance with rotation of the fan 63, air flows into the housing 66 through the vent holes provided on the first lid 68. The air flowing into the housing 66 flows from the left side toward the right side, and exchanges heat with the oil in the core 62. The air becomes hot due to the heat exchange with the oil, and is discharged to the outside of the housing 66 through the vent holes provided in the second lid 69.

The core 62 is disposed to face the first side surface 71 (the first lid 68) in the leftward and rightward direction. The fan 63 is disposed to face the core 62 in the leftward and rightward direction (the axial direction of the rotation shaft 260). The fan 63 is disposed between the core 62 and the second side surface 72 in the leftward and rightward direction. The motor 64 is disposed on the rotation shaft 260 of the fan 63. The motor 64 is disposed to face the second side surface 72 (the second lid 69) in the leftward and rightward direction. The motor 64 is disposed between the fan 63 and the second side surface 72 in the leftward and rightward direction.

In such a configuration, the first side surface 71 is disposed on the upstream side of the air flow created by the fan 63. The second side surface 72 is disposed on the downstream side of the air flow created by the fan 63. The core 62 is disposed on the upstream side of the fan 63 in the air flow created by the fan 63.

As illustrated in FIG. 3, the distance L1 between the center line 200 and the first side surface 71 in the leftward and rightward direction is smaller than the distance L2 between the center line 200 and the second side surface 72 in the leftward and rightward direction (L1<L2). In the oil cooler 61, the direction of the air flowing from the first side surface 71 toward the second side surface 72 corresponds to the direction from a central portion of the vehicle body 11 in the top view toward a peripheral portion of the vehicle body 11 (outside the hydraulic excavator 100) in the top view.

As illustrated in FIG. 5, the core 62P and the core 62Q are disposed side by side in the upward and downward direction. The fan 63P and the fan 63Q are disposed side by side in the upward and downward direction. The motor 64P and the motor 64Q are disposed side by side in the upward and downward direction. The core 62P, the fan 63P, and the motor 64P are disposed side by side in the leftward and rightward direction. The core 62Q, the fan 63Q, and the motor 64Q are disposed side by side in the leftward and rightward direction.

The oil cooler 61 may be disposed with one set of the core 62, the fan 63 and the motor 64, or may be disposed with a plurality of sets of the core 62, the fan 63 and the motor 64 such as 3 sets or more. In each set of the core 62, the fan 63 and the motor 64, a plurality of cores 62 may be disposed side by side in the leftward and rightward direction.

Next, the layout of the first passage 121, the second passage 122, the third passage 123, and the fourth passage 124 disposed around the oil cooler 61 will be described.

As illustrated in FIGS. 4 to 6, the first passage 121 is disposed on the side of the first side surface 71. The first passage 121 extends along the first side surface 71. The first passage 121 extends along the vertical plate 42a. The first passage 121 is disposed between the first side surface 71 and the vertical plate 42a in the leftward and rightward direction. The first side surface 71 is disposed between the first passage 121 and the core 62 (62P, 62Q) in the leftward and rightward direction.

The second passage 122 is disposed on the side of the second side surface 72. The second passage 122 extends along the second side surface 72. The second side surface 72 is disposed between the fan 63 (63P, 63Q) and the second passage 122 in the leftward and rightward direction. The second side surface 72 is disposed between the motor 64 (64P, 64Q) and the second passage 122 in the leftward and rightward direction.

The third passage 123 is disposed on the side of the third side surface 73. The third passage 123 extends along the third side surface 73. The third passage 123 is connected to the first passage 121 and the second passage 122. The left end of the third passage 123 is connected to the front end of the first passage 121. The right end of the third passage 123 is connected to the front end of the third passage 123.

The second passage 122 is disposed on an outer edge of the vehicle body 11 in the top view. The outer edge of the vehicle body 11 in the top view corresponds to a peripheral edge of the vehicle body 11 which forms a boundary of the hydraulic excavator 100 to the outside in the top view. The second passage 122 is disposed at the peripheral edge of the upper surface 110. The second passage 122 is disposed in a band-shaped region extending along the right side of the upper surface 110. The third passage 123 is disposed on the outer edge of the vehicle body 11 in the top view. The third passage 123 is disposed at the peripheral edge of the upper surface 110. The third passage 123 is disposed in a band-shaped region extending along the front side of the upper surface 110. The second passage 122 and the third passage 123 intersect at a corner of the peripheral edge of the upper surface 110.

The first passage 121, the second passage 122, and the third passage 123 are disposed to surround the oil cooler 61 in three directions, namely, the leftward direction, the rightward direction, and the forward direction.

The hydraulic revolving motor 82 (82A, 82B) is disposed inside the first passage 121. The hydraulic revolving motor 82 (82A, 82B) protrudes upward from the first passage 121. The hydraulic revolving motor 82A is disposed to face the first side surface 71. The hydraulic revolving motor 82B is disposed to face the hydraulic oil tank 81. In FIG. 3 which illustrates a top view of the revolving unit 13, the cab 31 is disposed to face the first side surface 71. The cab 31 is disposed to face the first side surface 71 with the boom 16 interposed therebetween.

In the hydraulic excavator 100, around the oil cooler 61, the first passage 121 is disposed on the side of the first side surface 71 disposed on the upstream side of the air flow, the second passage 122 is disposed on the side of the second side surface 72 disposed on the downstream side of the air flow, and the third passage 123 disposed to connect the first passage 121 and the second passage 122. Therefore, the operator can walk in the first passage 121 and the second passage 122 through the third passage 123 to clean the oil cooler 61 from both the upstream side and the downstream side of the air flow. Thus, the operator can remove the first lid 68 from the side of the first passage 121 to clean the core 62 and remove the second lid 69 from the side of the second passage 122 to clean the fan 63, which makes it possible to easily clean the oil cooler 61.

The second passage 122, which is disposed on the side of the second side surface 72 on the downstream side of the air flow, is disposed on an outer edge of the vehicle body 11 in the top view. Therefore, the hot air discharged from the oil cooler 61 is discharged to the outside of the hydraulic excavator 100 from the outer edge of the vehicle body 11 in which the second passage 122 is disposed in the top view.

Thus, since the hot air discharged from the oil cooler 61 is prevented from entering the cab 31 disposed to face the first side surface 71 in the top view, it is possible to favorably maintain the operator comfortable in the cab 31. Further, since the hot air discharged from the oil cooler 61 is prevented from heating the hydraulic revolving motor 82A disposed to face the first side surface 71, it is possible for the hydraulic revolving motor 82A to function favorably.

Since the core 62 has a pore structure (mesh structure) in which a tube and a plurality of fins intersect with each other, when the air passes through the inner side of the housing 66, dust in the air is likely to adhere to the core 62. In addition, since dust in the air is likely to adhere to the core 62 when the air collides with the core 62, a portion of the core 62 on the upstream side of the air flow is mostly contaminated. Thus, in the hydraulic excavator 100, the core 62 is disposed on the upstream side of the fan 63 in the air flow direction. Therefore, when the operator cleans the oil cooler 61 from the first passage 121, the operator can easily clean the mostly contaminated portion of the core 62 in the oil cooler 61 without being obstructed by the fan 63.

As illustrated in FIG. 6, the first passage 121 is connected to the third passage 123 and the fourth passage 124. The first passage 121 is connected to the third passage 123 at a front end extending along the first side surface 71. The first passage 121 is connected to the fourth passage 124 at a rear end extending along the first side surface 71. The first passage 121 extends linearly in the frontward and rearward direction between the third passage 123 and the fourth passage 124. The first passage 121 extends to face the hydraulic oil tank 81 in the top view.

The second passage 122 is connected to the third passage 123 and the fourth passage 124. The second passage 122 is connected to the third passage 123 at a front end extending along the first side surface 71. The second passage 122 is connected to the fourth passage 124 at a rear end extending along the second side surface 72. The second passage 122 extends linearly in the frontward and rearward direction between the third passage 123 and the fourth passage 124. The second passage 122 extends to face the hydraulic oil tank 81 in the top view.

The first passage 121, the second passage 122, the third passage 123, and the fourth passage 124 form a peripheral passage that surrounds the oil cooler 61 and the hydraulic oil tank 81.

In the hydraulic excavator 100, the first passage 121 is connected to the third passage 123 and the fourth passage 124. Therefore, the operator can enter the first passage 121 from the second passage 122 through the intermediary of the third passage 123, and can enter the first passage 121 directly from the fourth passage 124. Thereby, it is easy to enter the first passage 121, which makes it possible to further easily clean the oil cooler 61.

The first passage 121 and the second passage 122 extend to face the hydraulic oil tank 81 in the top view. Thus, the operator can check the hydraulic oil tank 81 from the first passage 121 or the second passage 122, which makes it possible to easily check the hydraulic oil tank 81. In addition, since the hydraulic oil tank 81 is disposed closer to the oil cooler 61, it is possible to shorten the pipes disposed between the oil cooler 61 and the hydraulic oil tank 81.

As illustrated in FIG. 4, the first passage 121 is opened at least in the upward direction and in the direction along which the third passage 123 is disposed. No roof member is disposed above the first passage 121. No wall member is disposed between the first passage 121 and the third passage 123 to blockade the first passage 121 and the third passage 123. The first passage 121 is further opened to the side where the fourth passage 124 is disposed. No wall member is disposed between the first passage 121 and the fourth passage 124 to blockade the first passage 121 and the fourth passage 124. Thus, the first passage 121 is opened in three directions, namely, the upward direction, the frontward direction, and the rearward direction.

During the cleaning of the oil cooler 61, the operator uses cleaning tools such as a brush, a bucket, and a spray nozzle that sprays water. In the hydraulic excavator 100, since the first passage 121 is opened at least in the upward direction and in the direction along which the third passage 123 is disposed, the operator can easily carry these cleaning tools into the first passage 121, and can easily use the cleaning tools to clean the oil cooler 61. Thus, it is possible to further easily clean the oil cooler 61.

Figure 7:
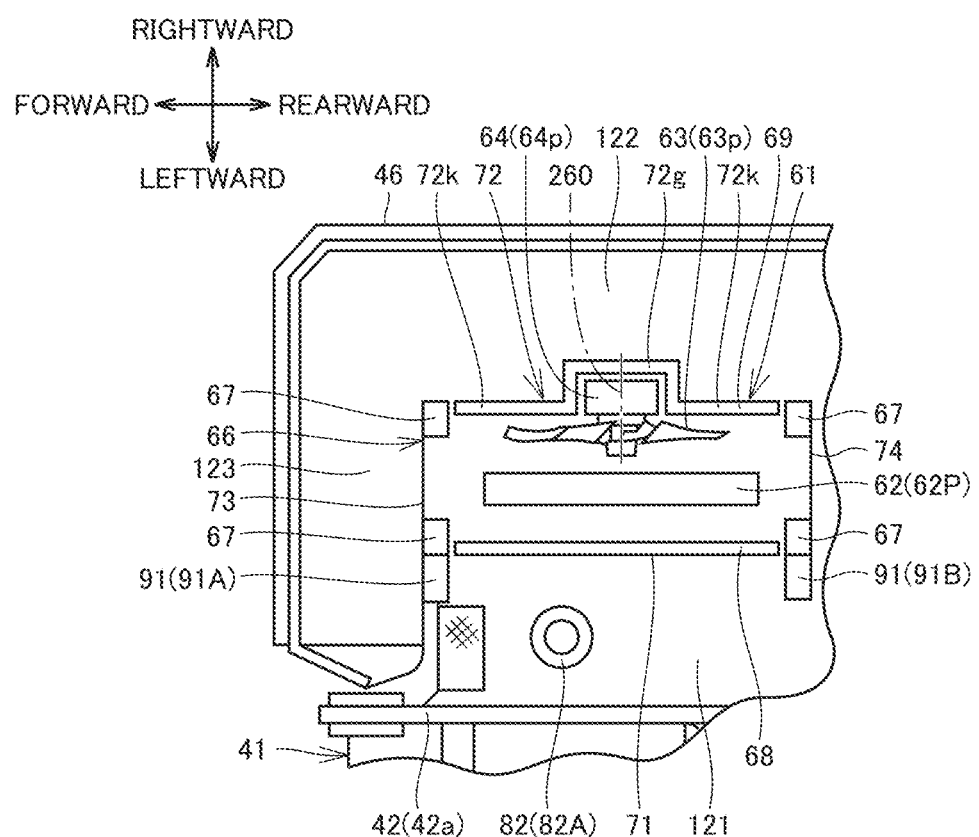
FIG. 7 is a cross-sectional view illustrating a modification of the housing in FIG. 6.

FIG. 7 is a cross-sectional view illustrating a modification of the housing in FIG. 6. As illustrated in FIG. 7, in the present modification, the second side surface 72 has a base 72k and a protrusion 72g. The protrusion 72g is disposed to face the motor 64 in the leftward and rightward direction. The base 72k is disposed around the protrusion 72g in a top view of the second side surface 72. The protrusion 72g protrudes from the base 72k toward the second passage 122.

On the other hand, as illustrated in FIG. 6, in the hydraulic excavator 100, the second side surface 72 has a planar shape orthogonal to the rotation shaft 260 of the fan 63. The plurality of second lids 69 are disposed on a plane orthogonal to the rotation shaft 260 of the fan 63. In this case, since the protrusion 72g corresponding to the shape of the motor 64 is not disposed on the second side surface 72, the operator can easily pass through the second passage 122 disposed on the side of the second side surface 72 as compared with the modification illustrated in FIG. 7.

Next, a support structure of the oil cooler 61 will be described. As illustrated in FIGS. 4 and 5, the housing 66 further includes a rib 91 (91A, 91B).

The rib 91 is disposed on the first side surface 71. The rib 91 protrudes leftward from the first side surface 71. The rib 91 protrudes from the first side surface 71 of the frame 67 toward the first passage 121.

The rib 91 is disposed at a position closer to the lower end of the first side surface 71. The rib 91 is disposed at a position lower than the pivot shaft 220 of the boom 16. The rib 91 is disposed at a position higher than the pivot shaft 230 of the boom cylinder 20. The ribs 91A and 91B are disposed with an interval between each other in the frontward and rearward direction. The rib 91A is disposed at the front end of the first side surface 71. The rib 91B is disposed at the rear end of the first side surface 71.

The revolving frame 41 further includes a projection member 43. The projection member 43 projects rightward from the vertical plate 42a. The projection member 43 projects from the vertical plate 42a toward the oil cooler 61. The projection member 43 has a top surface 43t. The top surface 43t is horizontal.

The rib 91 (91A, 91B) is connected to the projection member 43 (the top surface 43t) from the above. The projection member 43 receives the weight of the oil cooler 61. The top surface 43t constitutes the first passage 121.

The housing 66 further has a bottom 92. The bottom 92 constitutes a floor of the housing 66. The bottom 92 is disposed directly below the core 62. The bottom 92 is disposed at a position lower than the first passage 121 (the top surface 43t). The second passage 122 and the third passage 123 are disposed lower than the first passage 121. A step is disposed between the third passage 123 and the first passage 121.

The configuration and effects of the hydraulic excavator 100 according to the present embodiment described above will be summarized.

As an example of a work machine, the hydraulic excavator 100 includes a vehicle body 11 which corresponds to a work-machine body and an oil cooler 61 which corresponds to a cooling unit. The oil cooler 61 includes a fan 63 and a housing 66. The fan 63 creates an air flow. The housing 66 houses the fan 63. The oil cooler 61 is disposed on the vehicle body 11. The housing 66 has a first side surface 71, a second side surface 72, and a third side surface 73. The first side surface 71 is disposed on the upstream side of the air flow. The second side surface 72 is disposed on the downstream side of the air flow. The third side surface 73 is connected to the first side surface 71 and the second side surface 72. The vehicle body 11 is provided with a first passage 121, a second passage 122, and a third passage 123. The first passage 121 is disposed on the side of the first side surface 71. The second passage 122 is disposed on the side of the second side surface 72. The second passage 122 is disposed on the outer edge of the vehicle body 11 in a top view. The third passage 123 is disposed on the side of the third side surface 73. The third passage 123 is connected to the first passage 121 and the second passage 122.

According to this configuration, around the oil cooler 61, the first passage 121 is disposed on the side of the first side surface 71 which is disposed on the upstream side of the air flow, the second passage 122 is disposed on the side of the second side surface 72 which is disposed on the downstream side of the air flow, and the third passage 123 is disposed to connect the first passage 121 and the second passage 122. Therefore, the operator can walk in the first passage 121 and the second passage 122 through the third passage 123 to clean the oil cooler 61 from both the upstream side and the downstream side of the air flow, which makes it possible to easily clean the oil cooler 61.

In addition, the second passage 122 disposed on the downstream side of the air flow is disposed on the outer edge of the vehicle body 11 in the top view. Therefore, the air from the oil cooler 61 is discharged to the outside of the hydraulic excavator 100 from the outer edge of the vehicle body 11 in which the second passage 122 is disposed in the top view. Thus, it is possible to prevent the performance of the hydraulic excavator 100 from being deteriorated by the hot air discharged from the oil cooler 61.

The oil cooler 61 further includes a core 62. The core 62 forms a flow path through which the oil (the hydraulic oil) flows as a fluid. The core 62 is housed in the housing 66. The core 62 is disposed on the upstream side of the fan 63 in the air flow direction.

According to this configuration, when the operator cleans the oil cooler 61 from the first passage 121, the operator can easily clean the mostly contaminated portion of the core 62 in the oil cooler 61 without being obstructed by the fan 63.

Further, the first passage 121 is opened at least in the upward direction and in the direction along which the third passage 123 is disposed.

According to this configuration, since the first passage 121 is widely opened, the operator can easily clean the oil cooler 61 from the first passage 121.

The vehicle body 11 is further provided with a fourth passage 124. The fourth passage 124 is disposed opposite to the third passage 123 with respect to the oil cooler 61. The first passage 121 is connected to the third passage 123 and the fourth passage 124.

According to this configuration, the operator can access the first passage 121 through the third passage 123 and can access the first passage 121 through the fourth passage 124, which makes it possible for the operator to further easily clean the oil cooler 61 from the first passage 121.

The hydraulic excavator 100 further includes a cab 31. The cab 31 is disposed to face the first side surface 71 in a top view.

According to this configuration, since the hot air discharged from the oil cooler 61 is discharged from the outer edge of the vehicle body 11 in which the second passage 122 is disposed in the top view to the outside of the hydraulic excavator 100, it is possible to prevent the hot air from flowing toward the cab 31, which makes it possible to favorably maintain the operator comfortable in the cab 31.

The hydraulic excavator 100 further includes a hydraulic revolving motor 82A as a hydraulic component. The hydraulic revolving motor 82A is disposed to face the first side surface 71.

According to this configuration, since the hot air discharged from the oil cooler 61 is discharged from the outer edge of the vehicle body 11 in which the second passage 122 is disposed in the top view to the outside of the hydraulic excavator 100, it is possible to prevent the hot air from flowing toward the hydraulic revolving motor 82A. Thus, it is possible to prevent the temperature of the hydraulic revolving motor 82A from rising unintentionally, which makes it possible for the hydraulic revolving motor 82A to perform efficiently.

The hydraulic excavator 100 further includes a hydraulic oil tank 81. The hydraulic oil tank 81 is disposed opposite to the third passage 123 with respect to the oil cooler 61. The first passage 121 and the second passage 122 extend to face the hydraulic oil tank 81 in the top view.

With this configuration, the operator can check the hydraulic oil tank 81 from the first passage 121 or the second passage 122, which makes it possible to easily check the hydraulic oil tank 81.

The oil cooler 61 further includes a motor 64. The motor 64 is housed in the housing 66. The motor 64 protrudes from the fan 63 toward the second side surface 72. The second side surface 72 has a planar shape orthogonal to the rotation shaft 260 of the fan 63.

According to this configuration, since the second side surface 72 of the housing 66 is not provided with a convex shape corresponding to the shape of the motor 64, the operator can easily walk through the second passage 122 disposed on the side of the second side surface 72.

The cooling unit in the present disclosure is not limited to an oil cooler, it may be, for example, a radiator, a fuel cooler, an intake cooler of an engine, an air-conditioner condenser, or an oil cooler for cooling lubricating oil in a PTO. In addition, the present disclosure is applied to various work machines including a cooling unit. The work machine in the present disclosure may be, for example, a bulldozer, a wheel loader, a motor grader, a crane, a forestry machine, or the like.

It should be understood that the embodiments disclosed herein are illustrative and not restrictive in all respects. It is intended that the scope of the present disclosure is not limited to the description above but defined by the scope of the claims and encompasses all modifications equivalent in meaning and scope to the claims.

REFERENCE SIGNS LIST

11: vehicle body; 12: work implement; 13: revolving unit; 14: counterweight; 15: travel unit; 16: boom; 17: arm; 18: bucket; 20, 20L, 20R: boom cylinder; 21, 21L, 21R: arm cylinder; 22, 22L, 22R: bucket cylinder; 23: boom pin; 24: arm pin; 25: bucket pin; 31: cab; 32: operator's seat; 35: travel frame; 36: crawler belt; 37: travel motor; 38: revolving mechanism; 41: revolving frame; 42, 42a, 42b, 42c, 42d: vertical plate; 43: projection member; 43t: top surface; 46: platform; 51: engine compartment; 51f: front side surface; 51h: left side surface; 51r: right side surface; 52: first door; 53: second door; 55: engine; 55s: crankshaft; 56: radiator; 58: oil pump; 61: oil cooler; 62, 62P, 62Q: core; 63, 63P, 63Q: fan; 64, 64P, 64Q: motor; 66: housing; 67: frame; 68: first lid; 69: second lid; 71: first side surface; 72: second side surface; 72g: protrusion; 72k: base; 73: third side surface; 74: fourth side surface; 81: hydraulic oil tank; 82, 82A, 82B: hydraulic revolving motor; 83: electric chamber; 84: fuel tank; 85: roof surface; 86: first ladder; 87: second ladder; 88: footboard; 91, 91A, 91B: rib; 92: bottom; 100: hydraulic excavator; 110: top surface; 121: first passage; 122: second passage; 123: third passage; 124: fourth passage; 125: fifth passage; 126: sixth passage; 127: seventh passage; 128: eighth passage; 200: center line; 210: revolution shaft; 220, 230: pivot shaft; 260: rotation shaft

The invention claimed is:

1. A work machine comprising:
   a work-machine body; and
   a cooling unit which is disposed on the work-machine body and includes a fan that creates an air flow and a housing that houses the fan, wherein
   the housing having a first side surface which is disposed on an upstream side of the air flow, a second side surface which is disposed on a downstream side of the air flow, and a third side surface which is connected to the first side surface and the second side surface,
   the work-machine body being provided with a first passage which is disposed on the side of the first side surface, a second passage which is disposed on a side of the second side surface and on an outer edge of the work-machine body in a top view, and a third passage which is disposed on the side of the third side surface and is connected to the first passage and the second passage,
   the cooling unit further includes a core which is housed in the housing and is configured to form a flow path through which a fluid flows, and
   the core is disposed on the upstream side of the fan in the air flow direction.

2. The work machine according to claim 1, wherein the first passage is opened in an upward direction and in a direction along which the third passage is disposed.

3. The work machine according to claim 1, wherein the work-machine body is further provided with a fourth passage which is disposed opposite to the third passage with respect to the cooling unit,
   the first passage is connected to the third passage and the fourth passage.

4. The work machine according to claim 1, further comprising:
   a cab which is disposed to face the first side surface in the top view.

5. The work machine according to claim 1, further comprising:
   a hydraulic component which is disposed to face the first side surface.

6. The work machine according to claim 1, further comprising:
   a hydraulic fluid tank which is disposed opposite to the third passage with respect to the cooling unit,
   wherein the first passage and the second passage extend to face the hydraulic oil tank in the top view.

7. The work machine according to claim 1, wherein the cooling unit further includes a motor which is housed in the housing and protrudes from the fan toward the second side surface,
   the second side surface has a planar shape, a plane formed of the planar shape is orthogonal to a rotation shaft of the fan.

* * * * *